United States Patent
Thizon et al.

(10) Patent No.: US 10,601,203 B2
(45) Date of Patent: Mar. 24, 2020

(54) FASTENING DEVICE FOR ELECTRIC CONTROL AND/OR INDICATOR MEMBER

(71) Applicant: Schneider Electric Industries SAS, Rueil-Malmaison (FR)

(72) Inventors: Patrice Thizon, Ruelle sur Touvre (FR); Maelle Franc, Marthon (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 65 days.

(21) Appl. No.: 15/974,735

(22) Filed: May 9, 2018

(65) Prior Publication Data
US 2018/0375303 A1  Dec. 27, 2018

(30) Foreign Application Priority Data
Jun. 21, 2017  (FR) .................................. 17 55638

(51) Int. Cl.
| | |
|---|---|
| *H02B 1/044* | (2006.01) |
| *H01H 3/02* | (2006.01) |
| *F21V 21/002* | (2006.01) |
| *F21V 21/088* | (2006.01) |
| *H01H 13/50* | (2006.01) |

(52) U.S. Cl.
CPC ........... *H02B 1/044* (2013.01); *F21V 21/002* (2013.01); *F21V 21/088* (2013.01); *H01H 3/022* (2013.01); *H01H 13/503* (2013.01)

(58) Field of Classification Search
CPC ..... H02B 1/044; F21V 21/002; F21V 21/088; H01H 3/022; H01H 13/503
See application file for complete search history.

(56) References Cited

U.S. PATENT DOCUMENTS

| | | | | |
|---|---|---|---|---|
| 3,555,215 A | * | 1/1971 | Dehn .................. | H01H 13/503 |
| | | | | 200/47 |
| 6,050,528 A | | 4/2000 | Bardy | |
| 8,420,961 B2 | * | 4/2013 | Weiden .................. | H01H 3/12 |
| | | | | 200/50.02 |

FOREIGN PATENT DOCUMENTS

| | | |
|---|---|---|
| DE | 1114880 | 10/1961 |
| EP | 0 889 564 A1 | 1/1999 |
| WO | WO 2012/089195 A2 | 7/2012 |

OTHER PUBLICATIONS

French Preliminary Search Report dated Mar. 12, 2018 in French Application 17 55638 filed on Jun. 21, 2017 (with English Translation of Categories of Cited Documents and Written Opinion).

\* cited by examiner

*Primary Examiner* — Anita M King
(74) *Attorney, Agent, or Firm* — Oblon, McClelland, Maier & Neustadt, L.L.P.

(57) ABSTRACT

A fastening device for an electric control and/or indicator member, which includes a base, a fastening clamp fitted pivotably on the base about a first axis, the clamp including at least one branch having a free end designed to form at least a first bearing point against a wall, an element hinged about a second axis and interacting with the clamp to cause it to pivot about the first axis, a clamping screw for controlling the pivoting of the clamp, the clamp being configured in such a way that a first plane including the first axis and the second axis and a second plane including the first axis and the first bearing point form an angle of between 110° and 160°.

9 Claims, 4 Drawing Sheets

FASTENING DEVICE FOR ELECTRIC CONTROL AND/OR INDICATOR MEMBER

TECHNICAL FIELD OF THE INVENTION

The present invention relates to a fastening device for an electric control and/or indicator member.

PRIOR ART

An electric control and/or indicator member usually takes the form of a push-to button, a rotating knob, an emergency stop button, an indicator lamp or a combination of a button and a lamp.

It conventionally comprises a head and a tubular body. It is designed to be fitted in an opening formed through a wall, for example that of the door of an electrical enclosure or a control console.

When the member is fitted on the wall, the tubular body is engaged through the opening formed in the wall, and the head bears against a front face of the wall. A fastening device is then used to fasten the member by providing an opposed bearing force against the rear face of the wall.

Notably, the patent EP0889564B1 describes a device for fastening such a control member.

With reference to FIG. 1, this fastening device, as described in the patent EP08889564B1, mainly comprises:
  A base fitted on the tubular body of the member by means of a lock;
  A clamp fitted pivotably on the base and a clamping screw for controlling the pivoting of the clamp.

At least one contact and/or illumination unit fastened to the base is designed to enable an electrical circuit to be controlled.

In this FIG. 1, the fastening device is associated with a control member of the push-button type and a contact and/or illumination unit is fastened to the base.

More recently, there has been a proposal to improve the compactness and reduce the overall depth of an assembly such as that described in the patent EP0889956B1, that is to say the assembly formed by the control member, the fastening device and said at least one contact and/or illumination unit.

FIG. 5 shows an assembly using a more compact contact and/or illumination unit. In this architecture, it can be seen that the association of a more compact contact and/or illumination unit and the fastening device known from the patent EP0889956B1 creates leakage paths, notably between the contact and/or illumination unit, the base of the fastening device, and the cables. Leakage paths are thus created, notably:
  Between the head of the clamping screw and the cable outlets at the contact and/or illumination unit;
  Between the metal lock fastening each contact and/or illumination unit on to the base and the cable outlets at the contact and/or illumination unit.

Consequently, such a more compact contact and/or illumination unit cannot, to without modification, be associated with the conventional fastening device and integrated into an assembly known from the prior patent EP0889956B1.

The object of the invention is therefore to propose a novel fastening device for a control and/or indicator member which may be compatible with the use of a more compact contact and/or illumination unit, with the aim of avoiding generating leakage paths.

DISCLOSURE OF THE INVENTION

This object is achieved by a fastening device for an electric control and/or indicator member designed to be assembled along a main axis through an opening formed in a wall and comprising a head designed to bear against a first face of the wall and a tubular body designed to be engaged through the opening, said fastening device comprising:
  a base designed to carry at least one electric contact and/or illumination unit,
  a fastening clamp fitted pivotably on the base about a first axis,
  said clamp comprising at least one branch having a free end designed to form at least a first bearing point against a second face of the wall, opposite said first face,
  an element hinged about a second axis and interacting with said clamp to cause it to pivot about said first axis,
  a clamping screw guided in said base and interacting with said hinging to control the pivoting of said clamp and comprising an end forming at least a second bearing point against said second face of the wall,
  the clamp being configured in such a way that a first plane including said first axis and said second axis and a second plane including said first axis and said first bearing point form an angle of between 110° and 160°.

According to a particular embodiment, said angle is between 120° and 150°.

According to a particular embodiment, the base comprises a body and a contact panel, and said contact panel is made of plastic material.

According to a particular embodiment, the clamp is yoke-shaped, having two branches interconnected by a link.

According to a particular embodiment, each of the two branches has at least one curved profile.

According to a particular embodiment, said hinged element comprises a nut plate which is hinged relative to the base.

The invention also relates to an electric control and/or indicator assembly comprising:
  an electric control and/or indicator member designed to be assembled along a main axis through an opening formed in a wall and comprising a head designed to bear against a first face of the wall and a tubular body designed to be engaged through the opening,
  a fastening device as defined above.

According to a particular embodiment, the electric control and/or indicator assembly comprises at least one contact and/or illumination unit fastened to the base of said fastening device.

According to a particular embodiment, the contact and/or illumination unit comprises at least one casing having a protrusion arranged to lengthen the leakage path between at least one cable outlet of said contact and/or illumination unit and a metal fastening lock of said contact and/or illumination unit on said base.

BRIEF DESCRIPTION OF THE DRAWINGS

Other characteristics and advantages will be apparent from the following detailed description, which is given in relation to the attached drawings listed below.

DETAILED DESCRIPTION OF AT LEAST ONE EMBODIMENT

In the remainder of the description, the terms "front" and "rear" are to be interpreted as referring to the wall to which a control and/or indicator member is fastened.

For the remainder of the description, a main axis (X) is defined, corresponding to the axis along which a control and/or indicator member is engaged through a wall for fitting.

A control and/or indicator member may mean, but is not limited to, a push-button, a rotating knob, an emergency stop button, or a display lamp.

Together with its fastening device and one or more contact units, the control and/or indicator member forms a control and/or indicator assembly.

The remainder of the description relates, in a non-limiting way, with reference to the attached drawings, to a control member such as a push-button and to the corresponding control assembly comprising this control member.

To provide a clearer understanding of the technical problems, the description below relates initially to a conventional control assembly as described in the prior patent EP0889956B1.

Figure 1A:
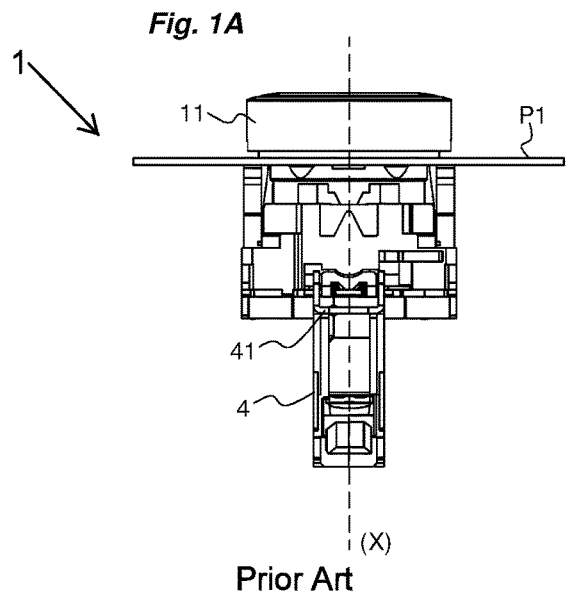
FIGS. 1A and 1B show a control assembly according to the prior art, fitted to a panel with a thickness of 1 mm.
Figure 1B:
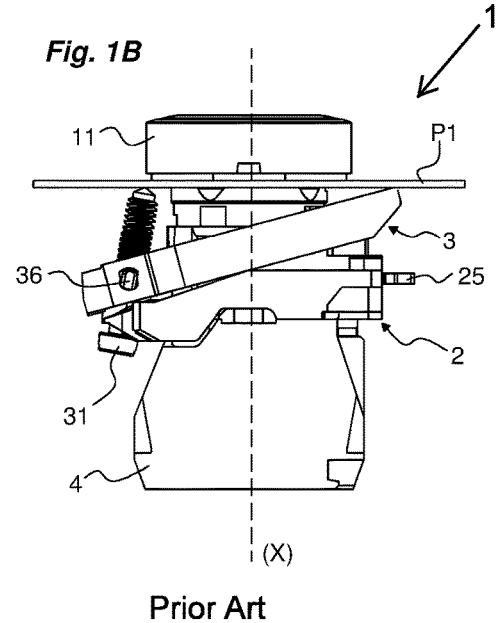

FIGS. 1A and 1B show such a known control assembly fitted to a wall P1 having a thickness of 1 mm.

Figure 2A:
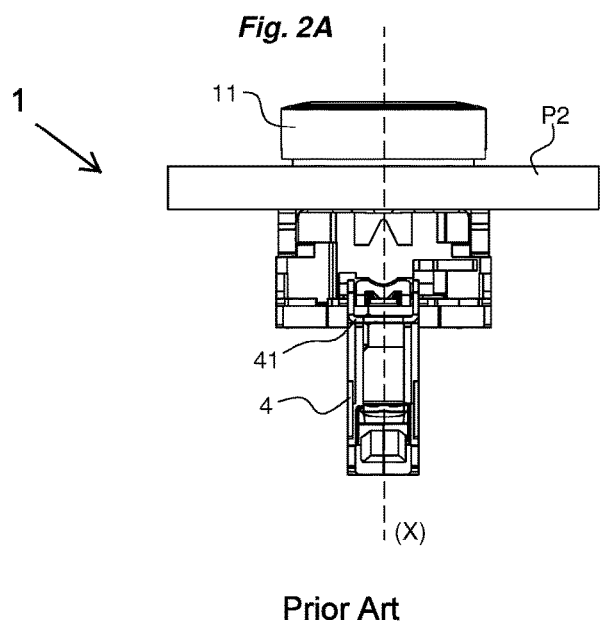
FIGS. 2A and 2B show a control assembly according to the prior art, fitted to a panel with a thickness of 6 mm.
Figure 2B:
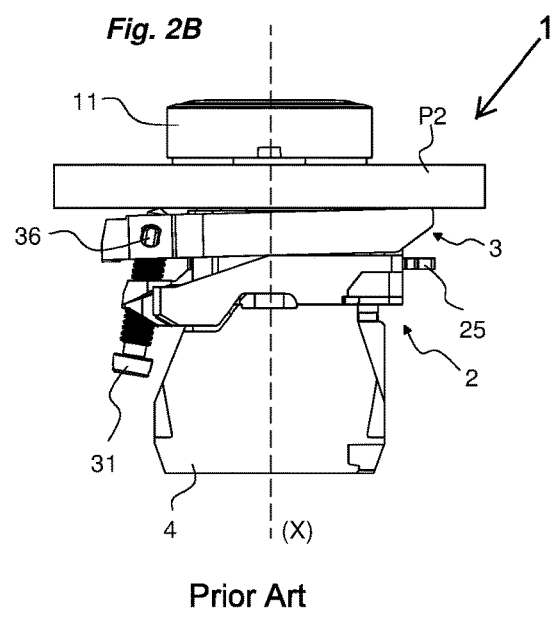

FIGS. 2A and 2B show such a known control assembly fitted to a wall P2 having a thickness of 6 mm.

The control member 1 typically comprises a head 11 and a tubular body 12 extending from the head 11.

Such a control member 1 is designed to be fitted through a wall P1, P2, for example one formed by the door of an electrical cabinet or a control console.

The wall P1, P2 comprises a front face and a rear face. The front face is accessible to the user for manipulating and displaying each control and/or indicator member, and the rear face is concealed from the user.

For each control and/or indicator member, the wall is pierced with a circular opening of standard diameter (a diameter of 22 mm, for example).

During fitting, the tubular body 12 of the member is engaged through the opening, and the head 11 bears against the front face of the wall, on the periphery of the opening, and possibly against a seal of suitable shape. The tubular part extends to the rear of the wall.

Figure 3A:
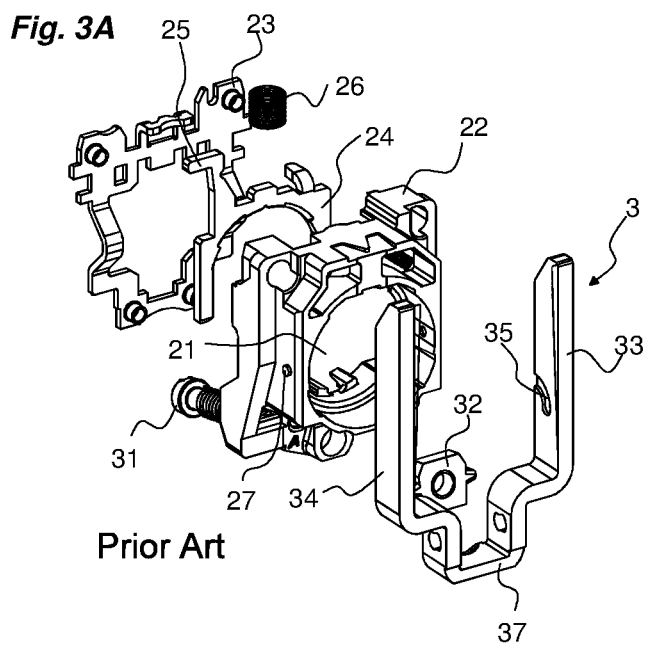
FIGS. 3A and 3B show the fastening device as used in the prior art, in an exploded view and in an assembled view respectively.
Figure 3B:
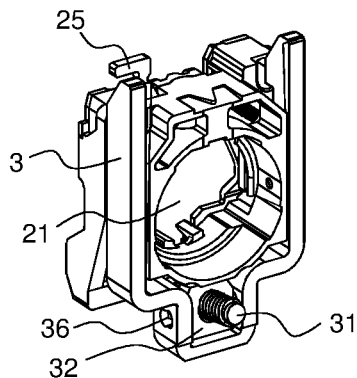

With reference to FIGS. 3A and 3B, a suitable fastening device fastens the member to the wall, at the rear. This fastening device comprises a fastening base 2, having a generally rectangular shape for example.

The base 2 is formed by a body 22 and a contact panel 23 assembled to said body by conventional means.

The body 22 of the base comprises an opening 21 adapted to receive the tubular body 12 of the control and/or indicator member.

The contact panel 23 also has an opening, and is designed to carry one or more electric contact and/or illumination units 4 in a removable manner, after locking.

The base 2 is designed to fit on to the tubular body 12 of the control member, at the rear of the wall P1, P2.

The fastening device comprises a lock 24 designed to lock the assembly of the base 2 on to the tubular body 12 and prevent the extraction of the base 2 in the axial direction.

The lock 24 is, for example, sliding and comprises, for example, a yoke, an operating finger 25 and a locking spring 26. The yoke is guided in slideways formed on the base and is subject to the force of the locking spring 26 which tends to move it towards the main axis (X).

The fastening device comprises means for bearing against the rear face of the wall P1, P2. The bearing means comprise a clamp 3 fitted pivotably on the base 2.

The clamp 3 advantageously takes the form of a U-shaped yoke which is advantageously symmetrical. It advantageously comprises two lateral branches 33, 34 interconnected by a link 37.

The two branches 33, 34 extend outside the base 2. The clamp 3 is allowed to pivot relative to the base 2 by a hinging mechanism comprising hinging bearings 35 formed on the inside of the branches and corresponding studs 27 formed on the body 22 of the base 2.

The fastening device also comprises a nut plate 32 fitted pivotably on the clamp 3. The nut plate 32 is hinged to the clamp by a hinge 36. The rotary clearances of the nut plate 32 are limited by stops provided in the hinge.

The fastening device comprises a clamping screw 31 of the set screw type.

The clamping screw 31 is guided in a bore formed through the body of the base 2 and is engaged by its end in the nut plate 32 so as to be screwed into said plate 32.

A contact and/or illumination unit 4 comprises a casing of plastic material, in a conventional way. A contact unit comprises a pusher and a pair of normally closed or normally open contacts that can be actuated by the pusher. An illumination unit comprises a light source designed to illuminate the member on the front face of the wall.

Each contact and/or illumination unit 4 is fastened on the contact panel 23 of the base 2. Each unit 4 is provided, on the one hand, with a movable attachment lock 41 which can engage in a striker of the plate, and, on the other hand, with a fixed attachment finger designed to be hooked in a striker of the plate of the base.

During fitting, the installer engages the tubular body 12 of the member frontally through the opening formed in the wall P1, P2. At the rear of the wall, he fits the base 2 on to the tubular body 12 until it is locked by the lock. By tightening the screw 31 he causes the clamp 3 to pivot. During clamping, the point of the screw 31 and the free ends of the two securing branches 33, 34 bear against the rear face of the wall P1, P2.

Figure 4:
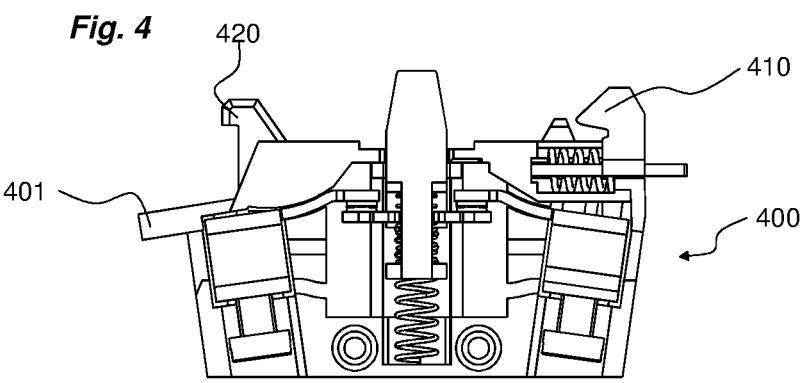
FIG. 4 shows a contact and/or illumination unit of a compact type.

With reference to FIG. 4, the contact and/or illumination unit may, notably, have a compact architecture, allowing a reduction in the overall depth of the assembly when this unit is assembled on to a base as described above.

Figure 5:
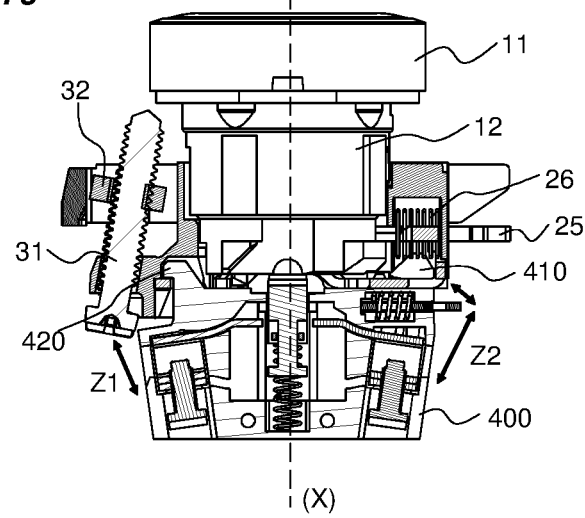
FIG. 5 shows a control assembly according to the prior art, using a compact contact and/or illumination unit as shown in FIG. 4.
Figure 6A:
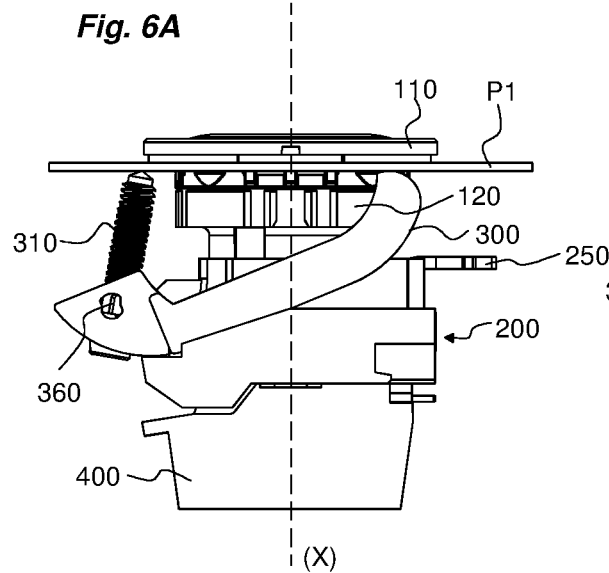
FIGS. 6A and 6B show a control assembly fitted to a panel with a thickness of 1 mm, using a fastening device according to the invention.
Figure 6B:
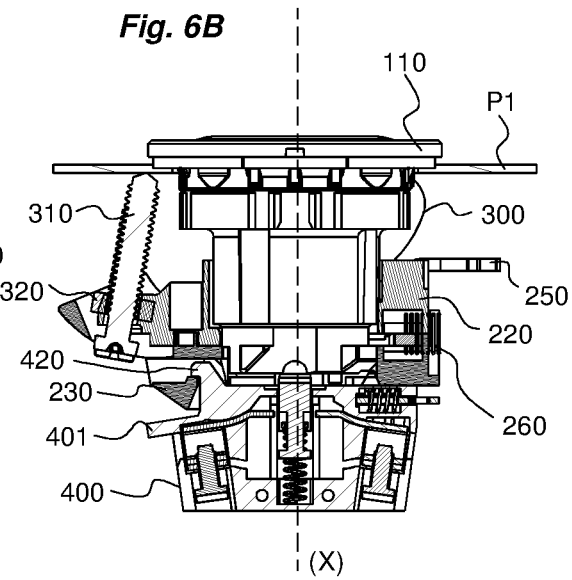
Figure 7A:
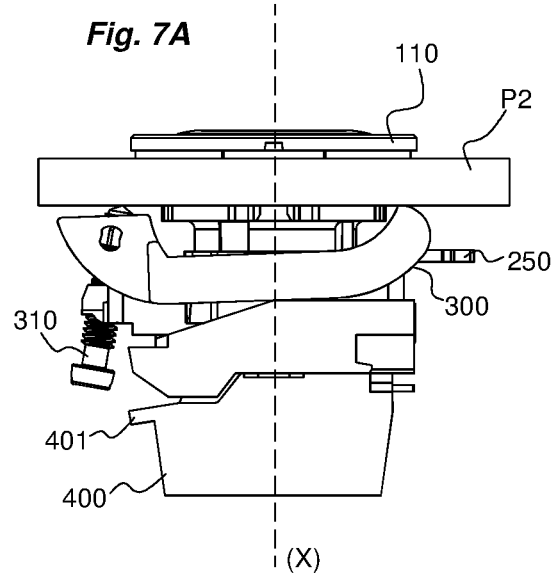
FIGS. 7A and 7B show a control assembly fitted to a panel with a thickness of 6 mm, using a fastening device according to the invention.
Figure 7B:
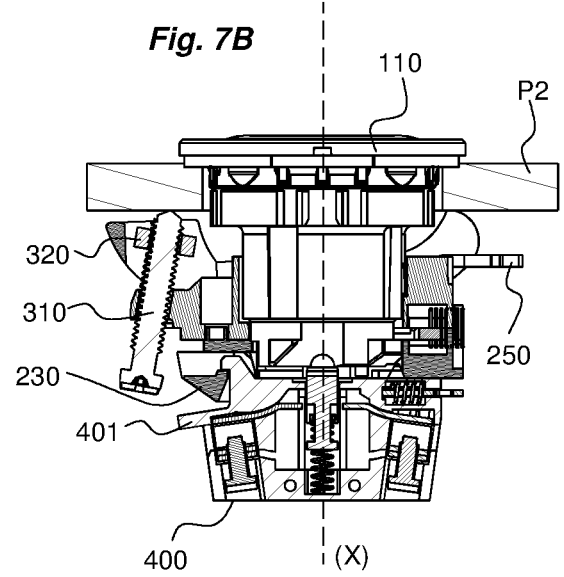

FIG. 5 shows that the use of such a compact contact and/or illumination unit 400 on a fastening device as described above results in the creation of leakage paths in certain areas that may cause short circuits. Notably, two areas of leakage path creation may be distinguished:
- A first area Z1 between the head of the clamping screw and the cable outlets at the contact and/or illumination unit;
- A second area Z2 between the metal lock fastening each contact and/or illumination unit on to the base and the cable outlets at the contact and/or illumination unit.

Figure 8:
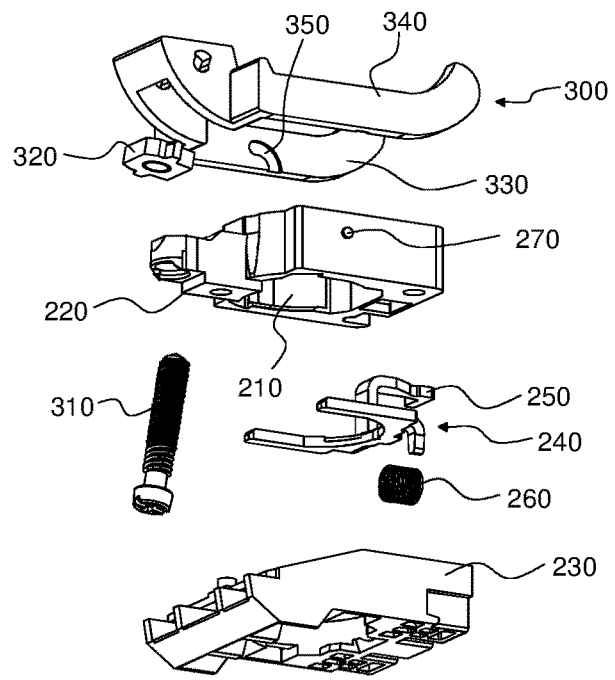
FIG. 8 shows the fastening device of the invention in an exploded view.

In order to counteract these probable leakage paths, the invention consists, notably, in proposing a modified fastening device such as that shown in FIG. 8.

The functions of the different elements remain the same as those defined above for the prior art.

Thus, for this fastening device, the references are as follows:
- Base 200,
- Opening 210,
- Base body 220,
- Contact panel 230,
- Lock 240,
- Operating finger 250,
- Spring 260,
- Studs 270,
- Pivoting clamp 300,
- Nut plate 320,
- Branches 330, 340,
- Hinge bearings 350,
- Hinge 360,
- Clamping screw 310,
- Contact unit 400,
- Attachment finger 420,
- Attachment screw 410.

In the fastening device according to the invention, the operating principle is the same as that described above. However, in this device the pivoting clamp 300 is configured in a particular way.

This will be more readily understood with the aid of the following definitions:
- A first axis A1 corresponding to the pivoting axis of the clamp relative to the base;
- A second axis A2 corresponding to the axis formed by the pivoting hinging of the nut plate;
- At least one bearing point located at the free end of each branch of the pivoting clamp, designed to bear against the rear face of the wall;
- The two bearing points formed are advantageously formed along a third axis A3;
- The first axis A1, the second axis A2 and the third axis A3 thus formed are advantageously parallel.

Figure 9A:
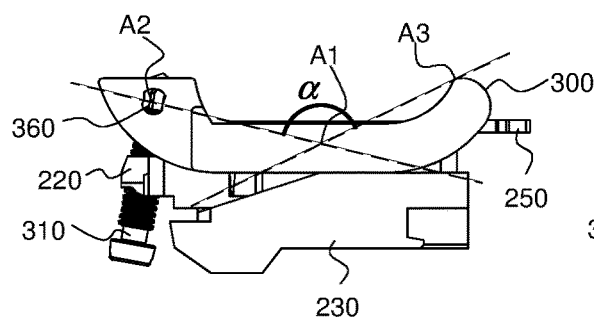
FIGS. 9A and 9B show, respectively, the fastening device of the invention and the prior art fastening device.

Given these definitions, with reference to FIG. 9A, it will be understood that the pivoting clamp is configured in such a way that:
- A first plane including the first axis A1 and the second axis A2 and a second plane including the first axis A1 and the third axis A3 are secant and form between them an angle α which is different from 180°, advantageously less than 160° and advantageously between 110° and 160°, advantageously between 120° and 150°, and advantageously substantially equal to 140°.

In other words, the first axis A1 is offset from the plane including the other two axes.

The vertex of the angle is defined by the points located on the first axis A1.

Figure 9B:
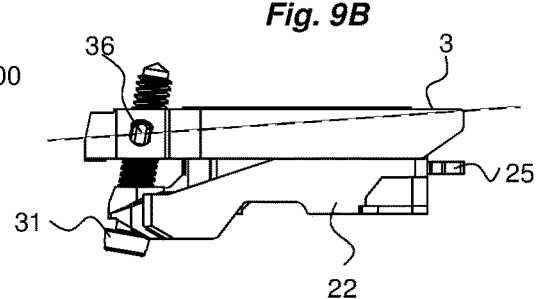

By offsetting the first axis A1 from the other two axes, it is thus possible to maintain a limited clearance of the screw 310 during clamping. In other words, for equivalent screw positions, the solution according to the invention provides better clamping on the wall. FIGS. 9A and 9B show the advantage provided by the solution according to the invention.

Additionally, by limiting the clearance of the screw 310 during clamping, the screw head can always be kept sufficiently distant from the cable outlets present on the contact and/or illumination unit, thus avoiding the occurrence of leakage currents between these elements.

With reference to FIGS. 8 and 9A, the two branches 330, 340 of the clamp 300 thus each have a generally curved profile, in which the second axis A2 and the third axis A3 are located in a different plane from the first axis A1.

Additionally, to improve the management of the leakage paths in the first area Z1, the dimensions of the various elements of the assembly may be modified, notably:
- By moving the clamping screw 310 away from the main axis (X) by elongating the base 200;
- By reducing the thickness of the head 110 of the control and/or indicator member and elongating the tubular body 120, thus enabling the contact and/or illumination unit 400 to be moved backwards and consequently away from the clamping screw 310.

In FIGS. 6A, 6B, 7A and 7B, it can thus be seen that the control and/or indicator member has a head 110 with a small thickness of less than 5 mm, so as to form an assembly whose head lies flush with the front face of the wall P1 or P2.

Advantageously, in order to avoid the creation of leakage paths in the second area Z2 described above, the contact panel 230 is made of plastic material. Thus the lock fastening the contact and/or illumination unit 400 to the contact panel 230 is not connected to earth and remains at a floating potential. This panel 230 is advantageously thick enough to prevent the creation of leakage paths.

Advantageously, it is also possible to design each contact and/or illumination unit to ensure that leakage paths are lengthened.

Thus, with reference to FIG. 4, this is a matter of adding a protrusion 401 on the casing of the contact and/or illumination unit 400 to force the leakage paths to travel around it. This protrusion 401 is positioned between the cable outlet of the to contact and/or illumination unit 400 and the finger 420 for attaching the contact and/or illumination unit to the base 200.

Figure 10A:
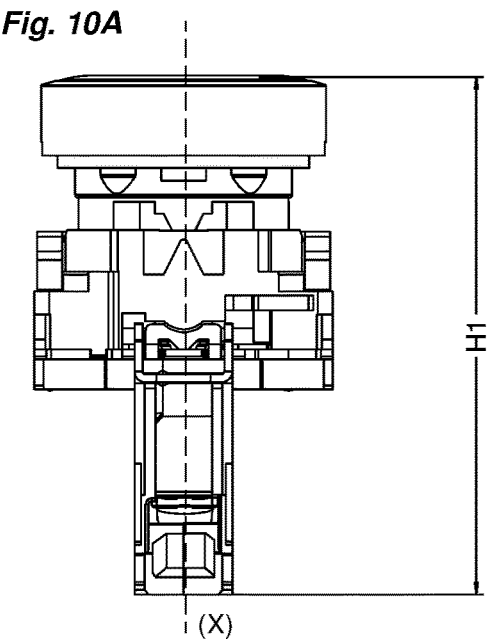
FIGS. 10A and 10B show a control assembly according to the prior art and according to the invention respectively, and show the resulting gain in compactness.
Figure 10B:
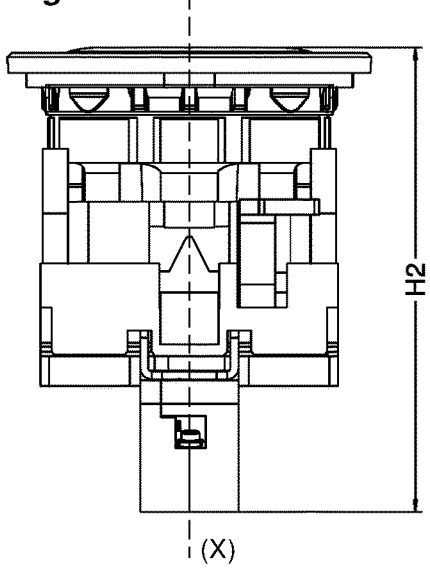

With reference to FIGS. 10A and 10B, it may thus be seen that the compactness of a control assembly may be reduced, by 6 mm in height for example, while not disregarding the management of the leakage paths as defined above. This is made possible, notably, by adapting the fastening device to these new constraints. In FIG. 10A, the prior art control assembly has an overall height of H1 and the control assembly according to the invention has an overall height of H2.

The invention claimed is:
1. A fastening device for an electric control and/or indicator member designed to be assembled along a main axis through an opening formed in a wall and comprising a head designed to bear against a first face of the wall and a tubular body designed to be engaged through the opening, said fastening device comprising:
  a base designed to carry at least one electric contact and/or illumination unit,
  a fastening clamp fitted pivotably on the base about a first axis, said clamp comprising at least one branch having a free end designed to form at least a first bearing point against a second face of the wall, opposite said first face, an element hinged about a second axis and interacting with said clamp to cause it to pivot about said first axis, a clamping screw guided in said base and interacting with said element to control the pivoting of said clamp and comprising an end forming at least a second bearing point against said second face of the wall, wherein:

the clamp is configured in such a way that a first plane including said first axis and said second axis and a second plane including said first axis and said first bearing point form an angle ($\alpha$) of between 110° and 160°.

2. The device according to claim 1, wherein said angle is between 120° and 150°.

3. The device according to claim 1, wherein the base comprises a body and a contact panel, and wherein said contact panel is made of plastic material.

4. The device according to claim 1, wherein the clamp is yoke-shaped, having two branches interconnected by a link.

5. The device according to claim 4, wherein each of the two branches has at least one curved profile.

6. The device according to claim 1, wherein said hinged element comprises a nut plate hinged relative to the base.

7. An electric control and/or indicator assembly comprising:

an electric control and/or indicator member designed to be assembled along a main axis through an opening formed in a wall and comprising a head designed to bear against a first face of the wall and a tubular body designed to be engaged through the opening, and a fastening device as defined in claim 1.

8. An assembly according to claim 7, wherein at least one contact and/or illumination unit fastened to the base of said fastening device.

9. The assembly according to claim 8, wherein the contact and/or illumination unit comprises at least one casing having a protrusion arranged to lengthen the leakage path between at least one cable outlet of said contact and/or illumination unit and a metal lock fastening said contact and/or illumination unit to said base.

* * * * *